United States Patent [19]

Brisko

[11] 3,951,115

[45] Apr. 20, 1976

[54] POLLUTION CONTROL DEVICE
[76] Inventor: Frank Brisko, Box 38, Ojibwa, Wis. 54862
[22] Filed: May 15, 1974
[21] Appl. No.: 470,262

[52] U.S. Cl. .......................... 123/119 B; 123/119 A; 123/117 A
[51] Int. Cl.² ......................................... F02M 7/00
[58] Field of Search ......... 123/119 A, 119 B, 117 A

[56] References Cited
UNITED STATES PATENTS

| | | | |
|---|---|---|---|
| 3,473,521 | 10/1969 | Mustain et al. | 123/119 B |
| 3,500,806 | 3/1970 | Sarto et al. | 123/97 B |
| 3,744,464 | 7/1973 | Soltan | 123/117 A |
| 3,789,811 | 2/1974 | Franz et al. | 123/117 A |
| 3,807,374 | 4/1974 | Marsee | 123/117 A |
| 3,809,038 | 5/1974 | Young | 123/117 A |
| 3,812,832 | 5/1974 | Scott | 123/117 A |
| 3,824,972 | 7/1974 | Sattler | 123/117 A |
| 3,844,260 | 10/1974 | Scott, Jr. et al. | 123/119 B |

Primary Examiner—Charles J. Myhre
Assistant Examiner—James D. Liles
Attorney, Agent, or Firm—Harness, Dickey & Pierce

[57] ABSTRACT

A pollution control device for an internal combustion engine that provides the combined functions of metering the flow of gases from the crank case ventilation system to the engine induction system, providing at preselected times a vacuum control signal to the vacuum advance circuit of the distributor and providing a vacuum control signal to the exhaust gas recirculation valve of the engine. These three functions are provided by a single valve member the position of which is controled by the induction system vacuum. A separator is provided between the valve and the discharge end of the crank case ventilation system to remove carbon and other particles and to condense a substantial portion of the oil vapors before these undesirable components are transmitted to the valve.

12 Claims, 6 Drawing Figures

U.S. Patent   April 20, 1976   3,951,115
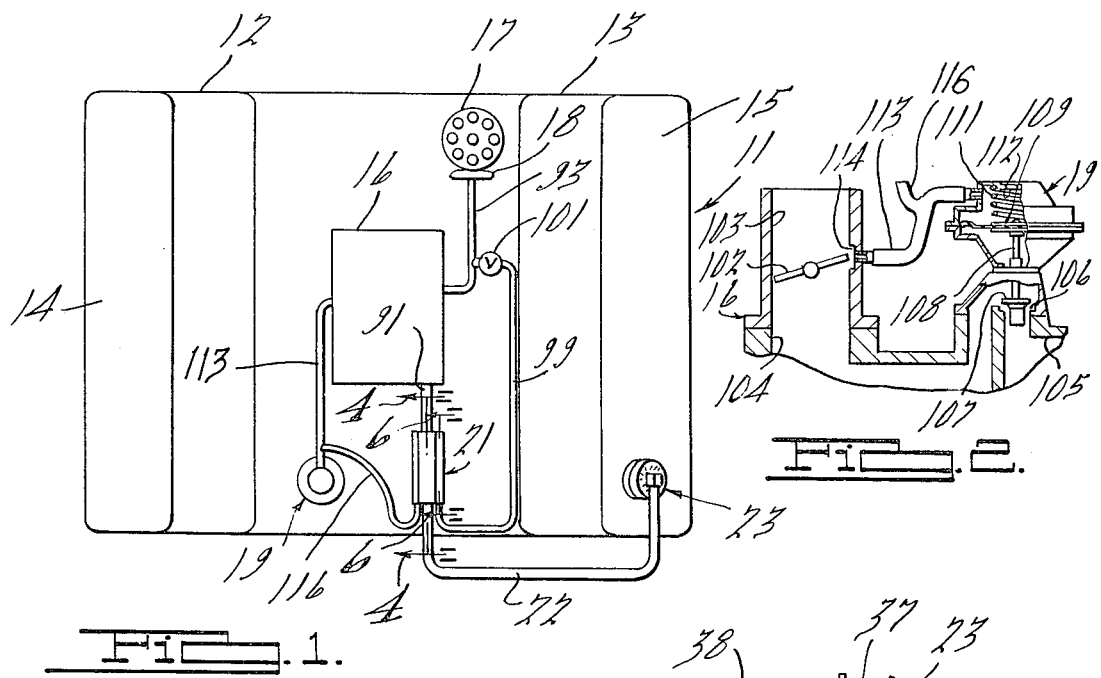
Fig. 1.
Fig. 2.
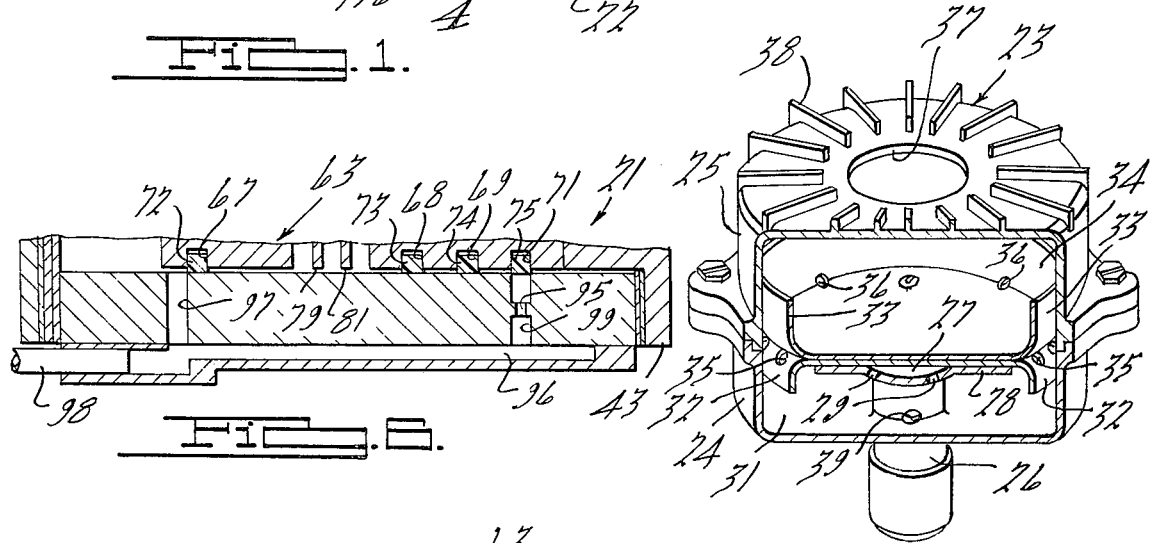
Fig. 3.
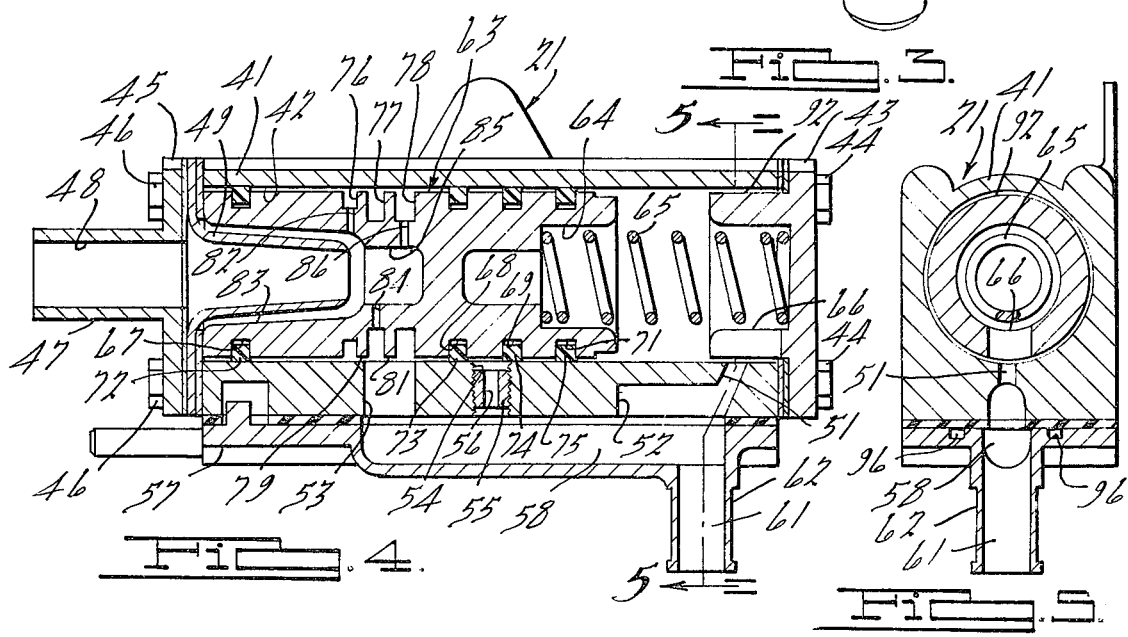
Fig. 4.
Fig. 5.

POLLUTION CONTROL DEVICE

BACKGROUND OF THE INVENTION

This invention relates to a pollution control device for an internal combustion engine.

In order to reduce the emission of unburned hydrocarbons from the exhaust of an internal combustion engine it has been proposed to retard the spark under certain operating conditions. Generally the spark is retarded during idle or coast periods when intake manifold vacuum is at its highest. This retardation is provided in a variety of manners but generally is accomplished by blocking off the communication of the vacuum advance circuit of the distributor from the portion of the induction system posterior to the throttle valve. Although this method is effective in reducing the amount of unburned hydrocarbons in the exhaust constituents under certain conditions, the retardation of the spark reduces performance both in terms of gas milage and accelleration. The stumbling or hesitation upon accelleration with most new cars is directly attributable to the retarded spark.

It is, therefore, a principal object of this invention to provide a pollution control device for an internal combustion engine that operates to retard the spark under certain conditions but which provides more immediate response upon accelleration.

It is another object of this invention to provide an improved valve that controls the vacuum signal to the vacuum advance circuit of the distributor in an improved manner.

Another constituent of the exhaust gases which must be controlled to meet standards set by the Federal Government for nitrous oxide. A common method of controlling nitrous oxide is through the recirculation of exhaust gases through the induction system to reduce peak combustion temperatures. The degree of exhaust gas recirculation is controlled by a valve, generally called the EGR valve, which is also responsive to induction system vacuum. Again, these valves tend to operate in such a manner so as to reduce engine performance by providing rough off idle operation, poor accelleration and reduced gas mileage.

It is, therefore, another principal object of this invention to provide a pollution control system for an internal combustion engine in which more accurate control over the operation of the EGR valve is provided.

For many years the emission of undesirable constituents to the atmosphere from internal combustion engines has been reduced by discharging the crank case ventilating gases into the induction system rather than directly into the atmosphere. By discharging the crank case ventilating gases into the induction system, further combustion is possible, thus reducing the emission of undesirable constituents. Because the intake manifold vacuum varies significantly with engine operating characteristics and this variance is not related to the desired flow of ventilating air through the crank case, some form of regulating valve is employed in the conduit leading from the discharge of the crank case ventilating system to the engine induction system. These valves are normally vacuum responsive and provide an increased restriction to flow at increased intake manifold vacuums to control the flow of gases from the crank case to the induction system.

Yet another principal object of this invention is to provide an improved crank case ventilating valve that also provides a control vacuum signal for another component of the pollution control equipment of the engine.

SUMMARY OF THE INVENTION

A first feature of this invention is adapted to be embodied in a pollution control device for an internal combustion engine having an induction system, a crankcase ventilating system having its discharge communication with the induction system, a distributor having a vacuum advance communicating with the induction system, and means for precluding the exertion of vacuum from the induction system to the vacuum advance of the distributor under predetermined conditions. The invention comprises valve means interposed in the conduit connecting the discharge of the crankcase ventilating system with the induction system for controlling the communication therebetween in response to the vacuum in the induction system. In addition, the valve means is interposed in a conduit between the induction system and the distributor vacuum advance for providing a vacuum advance signal to the distributor independent of the means for precluding the exertion of vacuum from the induction system to the vacuum advance.

Another feature of the invention is adapted to be embodied in a pollution control system for an internal combustion engine having an induction system, an exhaust system, and an exhaust gas recirculating system including an exhaust gas recirculation valve for recirculating a portion of the exhaust gases from the exhaust system into the induction system. In conjunction with this feature of the invention, control valve means is provided for selectively providing a control pressure for operating the exhaust gas recirculating valve in response to the degree of vacuum in the engine induction system.

Yet another feature of the invention is adapted to be embodied in a valve for controlling the degree of communication between the discharge of an engine crankcase ventilating system and its induction system and for providing a preselected control pressure to a pollution control device of the associated engine. The valve comprises a housing providing a first port adapted to communicate with the engine induction system and a second port adapted to communicate with the discharge of the crankcase ventilating system of the engine. A movable valve member is supported within said housing and includes means for providing a flow restriction between the first and second ports in response to the degree of vacuum exerted with the first port. The valve member also controls the communication between the first port and a control signal port that is adapted to provide a control signal to an associated polution control device of the engine.

BRIEF DESCRIPTION OF THE DRAWINGS

FIG. 1 is a schematic view of an internal combustion engine incorporating a pollution control system in accordance with this invention.

FIG. 2 is a schematic, partial cross-sectional view of the engine shown in FIG. 1 and shows the exhaust gas recirculation system.

FIG. 3 is a perspective view, with a portion broken away of a separator adapted to be used in conjunction with this invention.

FIG. 4 is a longitudinal cross-sectional view of a control valve embodying this invention and is taken generally along the line 4—4 of FIG. 1 showing the valve spool in a first position.

FIG. 5 is a cross-sectional view of the valve taken along the line 5—5 of FIG. 4.

FIG. 6 is a cross-sectional view of the control valve taken along the line 6—6 of FIG. 1, showing the valve spool in another position.

DETAILED DESCRIPTION OF THE PREFERRED EMBODIMENT

Considering first FIG. 1 of the drawings, an internal combustion engine embodying this invention is illustrated schematically and is generally indicated by the reference numeral 11. The engine 11 is illustrated as being of the v-type and includes cylinder banks 12 and 13 each of which is provided with a respective valve cover 14 and 15. Between the cylinder banks 12 and 13 there is provided an induction system, which for the purposes of illustration is identified schematically by the rectangular area 16. As is well known, the induction system 16 includes an air cleaner, craburetor and intake manifold. A distributor 17 is driven by the engine for delivering a spark to the respective spark plugs (not shown) in a known manner. The distributor 17 includes a vacuum advance device, indicated partially at 18.

The engine 11 is also provided with a crankcase ventilating system by which outside air is circulated through certain components of the engine including the valve covers 14 and 15 and the engine crankcase (not shown). In the illustrated engine, the crankcase ventilating system inlet will be positioned in the valve cover 14 and the discharge will be provided in the valve cover 15. An exhaust gas recirculation system is provided for recirculating a portion of the exhaust gases of the engine 11 to the induction system 16. The exhaust gas recirculation system is shown in detail in FIG. 2 and includes an EGR valve, indicated generally by the reference numeral 19.

The crankcase ventilating system of the engine 11 includes a control valve, indicated generally by the reference numeral 21, which control valve incorporates this invention. The control valve 21 receives the discharge from the crankcase ventilating system via a conduit 22 which is fed from a separator, indicated generally by the reference numeral 23 and shown in most detail in FIG. 3.

The separator 23 is comprised of an outer housing consisting of a lower cup shaped member 24 and an upper, inverted cup shaped member 25. The lower member 24 is formed with a cylindrical extension 26 through which a central passage extends. The projection 26 is adapted to be positioned in fluid communication with the discharge of the crankcase ventilating system. In a preferred embodiment of the invention, a grommet (not shown) encircles the extension 26 and is pressed into an opening formed in the valve cover 15.

The passage formed in the extension 26 terminates in an enlarged cavity 27 formed by a plate 28. The plate 28 has a plurality of openings 29 that provide communication between the cavity 27 and an enlarged chamber 31 formed by the lower housing member 24. The gases that enter the chamber 31 through the openings 29 may flow upwardly around an annular channel formed by a lower baffle plate 32 and an upper baffle plate into a chamber 34 formed by the upper housing member 25. Apertures 35 and 36 formed in the baffle plates 32 and 33, respectively, provide additional flow areas. The crankcase gases are then discharged from the separator 23 through a central opening 37 formed in the upper housing member 25.

The separator 23 serves the function of providing a trap for retarding the flow of carbon and other large particles from the crankcase ventilating system into the valve 21. Furthermore, the circuitous path through the separator 23 and the provision of cooling fins 38 on the upper housing member 25 provide a cooling and condensation of the oil vapors from the flowing gases. The condensed oil may return to the crankcase via one or more drain holes 39 formed in the cylindrical member 26.

As has been noted, the gases flow from the separator 23 to the valve 21 through the conduit 22. The construction of the valve 21 may best be understood by reference to FIGS. 4 through 6. The valve 21 is comprised of a housing member 41 that defines a cylindrical bore 42. One end of the bore 42 is closed by a cover plate 43 that is affixed to the housing 41 by bolts 44. A closure member 45 is affixed to the housing 41 at the other end of the bore 42 by bolts 46. The closure member 45 has a cylindrical projection 47 that provides an internal passage 48 which communicates with the bore 42. A convergent nozzle 49 is affixed to the housing 41 by the closure member 45 and extends into the bore 42.

The housing 41 is formed with a first transversely extending passage 51 that intersects the bore 42 adjacent the cover plate 43. The passage 51 terminates at an elongated opening 52. A further transverse passage 53 extends from the bore 42 through the housing 41 at a point closer to the closure member 45. Between the passages 51 and 53 a further transverse passage 54 intersects the bore 42. A fitting 55 having an orifice 56 formed therein is received in the passage 54 to provide a restricted flow passage axially between the passages 51 and 53.

A cover plate 57 is affixed to the valve housing 41 and has a longitudinally extending passage 58 that communicates with the passages 52, 54 and 53. The passage 58 also communicates with a passage 61 formed by an outwardly extending nipple 62 of the cover plate 57.

A valve spool, indicated generally by the reference numeral 63 is slidably supported within the bore 42. One end of the valve spool 63 is formed with a bore 64 into which a coil compression spring 65 extends. The opposite end of the spring 65 is received in a bore 66 formed in the closure plate 43. The spring 65 normally urges the valve spool 63 to an extreme left hand position as shown in FIG. 4.

The valve spool 63 is formed with circumferential grooves 67, 68, 69 and 71 in which respective sealing rings 72, 73, 74 and 75 are received. Between the sealing rings 72 and 73 there are formed three circumferential grooves 76, 77 and 78 with the grooves being separated by lands 79 and 81. A number of circumferentially spaced passages 82 extend radially inwardly from the base of the groove 76 to an enlarged diameter opening 83 formed in the left hand end of the valve spool 63. Larger diameter passages 84 extend through the base of the groove 77 to a reduced diameter opening 75 formed in the valve spool 63 at the base of the opening 83. In a like manner, passages 86 extend from the base of the groove 76 into the reduced diameter opening 85.

The conduit 22 communicates with the valve 21 via connection to the cylindrical portion 47 of the closure member 45. Discharge gases from the crankcase ventilating system, therefore, enter the bore 42 through the passage 48 and convergent nozzle 49. The passage 61 of the cover plate 57 forms the discharge of the valve 21 and communicates with the induction system 16 posterior to the throttle valve of the carburetor via a conduit 91. Thus, intake manifold vacuum is experienced in the passages 61 and 58. The position of the valve spool 63 controls the flow area which exists between the passages 48 and 61 and thus provides a flow restriction that is dependent upon the degree of intake manifold vacuum.

FIG. 4 illustrates the position of the valve spool 63 when the engine is not running or when relatively low intake manifold vacuum is experienced. Assuming either of these conditions, the spring 65 will urge the valve spool 63 to its extreme left hand position. In this position, the relatively large passages 84 and 86 communicate with the passage 53 and a relatively large flow area will be provided through the passage 48, convergent nozzle 49, reduced diameter opening 85 and passages 84 and 86. Crankcase ventilation gases discharged through the separator 23 then may flow through the aforedescribed path into the opening 58 and passage 61 for discharge into the induction system 16 through the conduit 91.

In the event intake manifold vacuum increases, the decreased pressure will be experienced on the right hand side of the valve spool 63 through the passages 52 and 51. This reduced pressure will cause the valve spool 63 to begin to move to the right as viewed in FIG. 4. During the initial movement, the communication of the passages 85 with the passage 53 will be cut off as the land 81 moves across the passage 53. Simultaneously, the passages 82 will communicate with the passage 53. Thus, the flow area between the crankcase ventilating system and the induction system is now provided by the passages 82 and 84. This is a reduced area from that which existed previously and this restriction in area will compensate for the increased pressure differential between the induction system 16 and the crankcase ventilating system to provide the desired flow rate through the crankcase ventilating system.

If a further reduction in intake manifold vacuum occurs, the passages 84 will be moved out of registry with the passage 53 and only the passages 82 will provide a flow area between the crankcase ventilating system and the induction system 16.

Under the condition of maximum intake manifold vacuum, as occurs either during idle or during a coast condition, the valve spool 63 will shuttle all the way to the right until it abutts a cylindrical portion 92 of the cover plate 43. In this condition, the passages 84 and 86 will communicate with the passage 54 in which the orifice 56 is provided. The size of the orifice 56 will determine the flow area existing between the crankcase ventilating system and the induction system 16. The size of the orifice 56 may be tailored to suit individual engine requirements.

The vacuum advance system 18 for the distributor 17 has been described already generally. With a conventional engine, the vacuum advance system 18 receives a vacuum signal from the induction system 16 via a conduit, indicated schematically at 93. With conventional pollution control devices, the vacuum advance circuit of the distributor 17 is disabled under certain conditions to provide a retarded spark. Normally, the spark is retarded at idle and during deceleration by blocking off the vacuum signal from the conduit 93. This may be done by eliminating the normal vacuum advance port formed in the carburetor below the idle position of the throttle valve, through the use of a separate valve member or in any other known manner. These conventional systems give rise to poor performance on reaccelleration and reduced fuel economy.

In accordance with this invention, the valve 21 provides an overriding vacuum advance signal to the vacuum advance circuit 18 of the distributor 17. This is provided by the portion of the valve 21 shown in FIG. 6. A first passage 94 extends through the housing member 41 from the bore 42 adjacent the cover plate 43. The passage 94 is formed with a restricted orifice 95 of predetermined size. The passage 94 terminates in a longitudinally extending channel 96 formed in the cover plate 57. A second passage 97 extends from the bore 42 adjacent the closure member 45 and terminates at the longitudinally extending channel 96. The channel 96 is provided with a discharge passage 98 which provides a signal that is transmitted to the distributor vacuum advance circuit 18 by means of a conduit 99 and check valve 101. The check valve 101 will be in a closed position when the pressure in the conduit 93 is less than the pressure in the conduit 99 and open when the pressure in the conduit 99 is less than the pressure in the conduit 93. Thus, the vacuum advance circuit 18 will experience the lower of the pressures exerted by the induction system 16 or the valve 21.

FIG. 6 illustrates the valve spool 63 in the position it occupies when there is a relatively high intake manifold vacuum. This occurs during idle or during extreme decelleration conditions. In this position, the valve spool 63 will be at the extreme right hand position of its travel and the passage 94 will be closed and the passage 97 opened. Thus, no intake manifold vacuum will be experienced in the conduit 99. As has been previously noted, any vacuum which may exist in the induction system 16 will be blocked from the portion of the conduit 93 downstream of its intersection with the conduit 99. Thus, the vacuum advance 18 will be disabled and the distributor 17 retarded. However, immediately upon reduction in the intake manifold vacuum the valve spool 63 will shift to the left and open communication with the passage 94. Thus, intake manifold vacuum will be transmitted from the portion of the bore 42 to the right of the valve spool 63 to the vacuum advance circuit 18 of the distributor 17 and vacuum advance will begin. Thus, the retarded spark condition will be subsided quickly and engine performance improved.

The exhaust gas recirculation system including the EGR valve 19 will now be described by reference to FIGS. 1 and 2. The induction system 16 includes a carburetor throttle valve 102 that controls the flow through an induction passage 103 into the intake manifold passage 104. An exhaust gas passage 105 can selectively communicate with the intake manifold passage 104 through a passage 106 which is controlled by a valve member 107. The valve member 107 is carried by a rod 108 that is connected to a diaphragm 109. A coil spring 111 is received in a chamber 112 above the diaphragm 109 and normally urges the valve member 107 to a closed position. The chamber 112 also experiences pressure in the induction passage 103 via a conduit 113 that terminates at a port 114 formed in the induction passage 103.

With the system thus described communication between the exhaust passage 105 and the induction passage 104 is precluded during periods of normal intake manifold vacuum as exists during off idle and full power operation. At idle and during coasting, high intake manifold vacuum will be exerted on the chamber 112 and cause the valve 107 to open to permit a portion of the exhaust gases to flow into the induction system 16. Again, however, this condition exists too long in normal engine operation resulting in poor performance, particularly roughness in off idle and hesitation on accelleration.

To overcome these problems a conduit 116 connects the chamber 112 with the valve 21. Porting similar to that shown in FIG. 6 is provided in the valve 21 to provide a separate source of intake manifold vacuum to the EGR valve 19 dependent upon the position of the valve spool 63. Thus, the valve member 21 overrides the normal system and provides more rapid closure of the valve member 107. The size of the corresponding orifice 95 for the EGR valve 19 may be different than that provided for the vacuum advance circuit 18. This is the reason for providing two separate passages to control each of these elements.

It is to be understood that the foregoing disclosure is that of a preferred embodiment of the invention. Various changes and modifications may be made without departing from the spirit and scope of the invention as defined by the appended claims.

I claims:

1. In an internal combustion engine having an induction system, a crankcase vacuum system having its discharge communicating with the induction system, a distributor having a vacuum advance communicating with the induction system, and means for precluding the exertion of vacuum from the induction system to the distributor vacuum advance under predetermined conditions, the improvement including valve means interposed in a conduit connecting the discharge of the crankcase vacuum system with the induction system for controlling the communication therebetween in response to the vacuum in the induction system and in a conduit between the induction system and the distributor vacuum advance for providing a vacuum advance signal to the distributor independent of the means for precluding the exertion of vacuum from the induction system to the distributor vacuum advance.

2. An internal combustion engine as set forth in claim 1 wherein the valve means comprises a single valve element for controlling the communication between the induction system and the distributor vacuum advance and the crankcase vacuum system.

3. An internal combustion engine as set forth in claim 2 wherein the valve means comprises a housing having a first port communicating with the discharge of the crankcase vacuum system, a second port in communication with the induction system, a third port communicating with the distributor vacuum advance, the single valve element controlling the communication between said ports.

4. An internal combustion engine as set forth in claim 3 wherein the valve element provides a variable flow area between the first and second ports in response to the degree of induction system vacuum.

5. An internal combustion engine as set forth in claim 1 wherein the engine further includes an exhaust gas recirculation means for recirculating a portion of the exhaust gases through the induction system and a pressure responsive valve member for controlling the degree of communication therebetween, the valve means providing a control signal for the pressure responsive valve member.

6. An internal combustion engine as set forth in claim 5 wherein the valve member comprises a signal valve element for controlling the communication between the induction system and the crankcase vacuum system, the distributor vacuum advance and the exhaust gas recirculating valve member.

7. An internal combustion engine as set forth in claim 6 wherein the valve means comprises a housing defining a first port in communication with the induction system, a second port in communication with the discharge of the crankcase vacuum system, a third port in communication with the distributor vacuum advance, a fourth port in communication with the exhaust gas recirculating valve member and the valve element controls the communication between said ports.

8. An internal combustion engine as set forth in claim 7 wherein the valve element provides a variable flow area between the first and second ports in response to the degree of induction system vacuum.

9. In an internal combustion engine having an induction system, a crankcase vacuum system having its discharge communicating with the induction system, an exhaust system, exhaust gas recirculation means for recirculating a portion of the exhaust gases from the exhaust system to the induction system including an exhaust gas recirculating valve for controlling the amount of such recirculation, the improvement comprising valve means interposed in the conduit connecting the discharge of said crankcase vacuum system with the induction system for controlling the communication therebetween in response to the vacuum in the induction system and in a conduit interconnecting the induction system with the exhaust gas recirculation valve for providing a signal for controlling said exhaust gas recirculation valve.

10. An internal combustion engine as set forth in claim 9 wherein the valve means includes a single valve element for controlling the communication between the induction system and the discharge of the crankcase vacuum system and the exhaust gas recirculation valve.

11. An internal combustion engine as set forth in claim 10 wherein the valve means comprises a housing havig a first port communicating with the discharge of the crankcase vacuum system, a second port in communication with the induction system, a third port communicating with the exhaust gas recirculation valve, the single valve element controlling the communication between said ports.

12. An internal combustion engine as set forth in claim 11 wherein the valve element provides a variable flow area between the first and second ports in response to the degree of induction system vacuum.

* * * * *